(12) United States Patent  
Yu

(10) Patent No.: US 6,749,422 B2  
(45) Date of Patent: Jun. 15, 2004

(54) SEPARABLE MANIFOLD OF HOT RUNNERS FOR METAL MOLDS OF INJECTION MOLDING MACHINES AND METHOD OF MANUFACTURING THE SAME

(75) Inventor: Young-Hee Yu, Seoul (KR)

(73) Assignee: Yudo Co. Ltd., Kyounggi-do (KR)

( * ) Notice: Subject to any disclaimer, the term of this patent is extended or adjusted under 35 U.S.C. 154(b) by 0 days.

(21) Appl. No.: 10/167,575

(22) Filed: Jun. 13, 2002

(65) Prior Publication Data

US 2003/0098140 A1 May 29, 2003

(30) Foreign Application Priority Data

Nov. 28, 2001 (KR) .......................................... 2001-74486

(51) Int. Cl.⁷ .............................................. B29C 45/22
(52) U.S. Cl. ........................ 425/572; 29/738; 264/328.8
(58) Field of Search ........................ 29/738; 264/328.8; 425/570, 572

(56) References Cited

U.S. PATENT DOCUMENTS

| | | | | | |
|---|---|---|---|---|---|
| 5,032,078 A | * | 7/1991 | Benenati | ...................... | 425/572 |
| 5,227,179 A | * | 7/1993 | Benenati | ...................... | 425/572 |
| 5,707,664 A | * | 1/1998 | Mak | ............................ | 425/572 |
| 6,544,027 B2 | * | 4/2003 | Yu | .............................. | 425/572 |

* cited by examiner

Primary Examiner—Tim Heitbrink  
(74) Attorney, Agent, or Firm—McDermott, Will & Emery

(57) ABSTRACT

Disclosed herein is a separable manifold of hot runners for metal molds of injection molding machines and a method of manufacturing the manifold. The manifold is designed to be separated into an upper plate and a lower plate while having a flow channel therebetween. The upper plate is assembled with the lower plate into a manifold after inserting a channel pipe covered with copper plates in the flow channel. Thus, the manifold of this invention is easy to manufacture. In addition, it is possible to easily grind the flow channel of the manifold so as to remove angled corners from the flow channel.

5 Claims, 3 Drawing Sheets

SEPARABLE MANIFOLD OF HOT RUNNERS FOR METAL MOLDS OF INJECTION MOLDING MACHINES AND METHOD OF MANUFACTURING THE SAME

BACKGROUND OF THE INVENTION

1. Field of the Invention

The present invention relates generally to manifolds of hot runners for metal molds used in the injection molding of synthetic resins, and a method of manufacturing such manifolds, and more particularly, to a manifold of hot runners for metal molds of injection molding machines, which is designed to be separated into an upper plate and a lower plate, and is provided with a ground channel pipe covered with a copper plate for keeping the temperature of a flow channel constant, thus forming the desired flow channel for the synthetic resins, and a method of manufacturing such a manifold.

2. Description of the Prior Art

Generally, manifolds of hot runners for metal molds used in the injection molding of synthetic resins have been manufactured by forming, using a gun drill, a flow channel in a steel plate having a single structure for bearing injection pressure, and then grinding the flow channel.

However, the conventional manifold has a problem that it is difficult to grind the interior of a flow channel hole bored by the gun drill. Furthermore, the conventional manifold has another problem that angled corners are formed at junctions where two or more holes bored by the gun drill meet when manufacturing a manifold of a complicated shape, since a boring process using the gun drill is carried out along a straight line.

That is, in FIGS. 4 and 5 showing a conventional manifold, the gun drill bores holes in a manifold 11 having a single structure such that the holes forming flow channels are intersected with each other. Therefore, the flow channels 12 formed in the manifold 11 meet at right angles, thus making angled corners 13. Such angled corners 13 may hinder smooth flow of synthetic resins. In order to solve the above problem, a special method may be used. However, such a special method unreasonably causes an increase in manufacturing costs of the manifolds.

When synthetic resins flow to the angled corners 13, the angled corners 13 cause a thermal decomposition of the synthetic resins or turbulence thereof, thus leading to a structural failure of glass fiber contained in the synthetic resins as a reinforcing additive.

In addition, since the conventional manifold is formed in a single structure, it is impossible to repair the manifold even when foreign materials are caught in the flow channel or the synthetic resins in the manifold lose fluidity due to carbonization. Therefore, the hot runner is not preferably used in the injection molding of synthetic resins sensitive to heat.

SUMMARY OF THE INVENTION

Accordingly, the present invention has been made keeping in mind the above problems occurring in the prior art, and an object of the present invention is to provide a separable manifold of hot runners for metal molds of injection molding machines, which is manufactured by designing the manifold in such a way as to be separated into an upper plate and a lower plate, forming a groove on the lower plate for receiving ground channel pipes therein, inserting the ground channel pipes into the groove, covering the channel pipes with copper plates, and assembling the upper plate with the lower plate.

Another object of the present invention is to provide a method of manufacturing the separable manifold of hot runners for the metal molds of injection molding machines, comprising the steps of: designing the manifold in such a way as to be separated into an upper plate and a lower plate, manufacturing joint blocks to be set on the junctions of two or more flow channels formed on the lower plate; forming a groove on the lower plate for receiving channel pipes therein; installing the joint blocks at the junctions where two or more channels meet; covering the channel pipe inserted into the groove with copper plates; connecting the channel pipe covered with the copper plates to the joint blocks; and assembling the upper plate with the lower plate.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
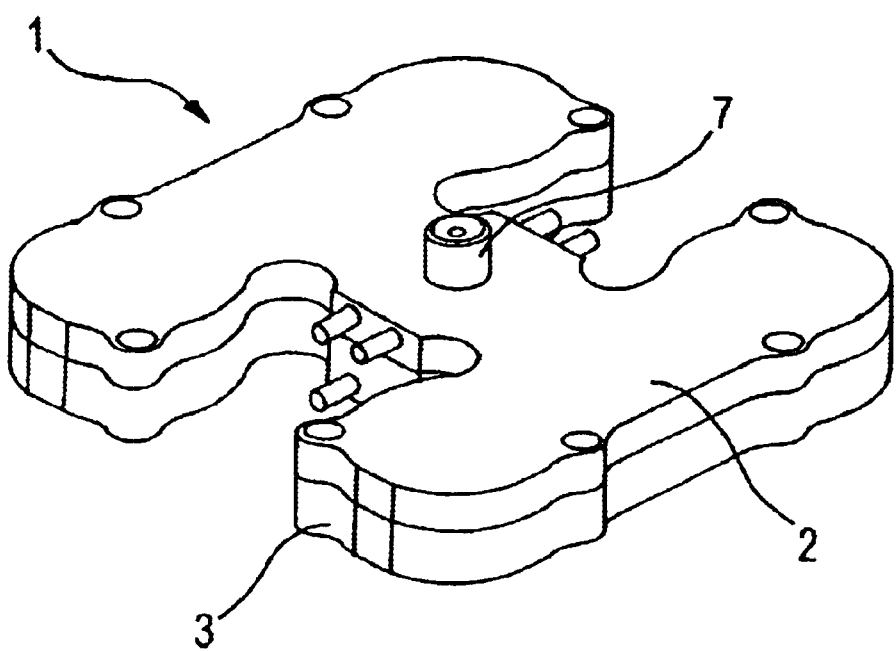
FIG. 1 is a perspective view showing a manifold according to the present invention.

Reference now should be made to the drawings, in which the same reference numerals are used throughout the different drawings to designate the same or similar components.

Figure 2:
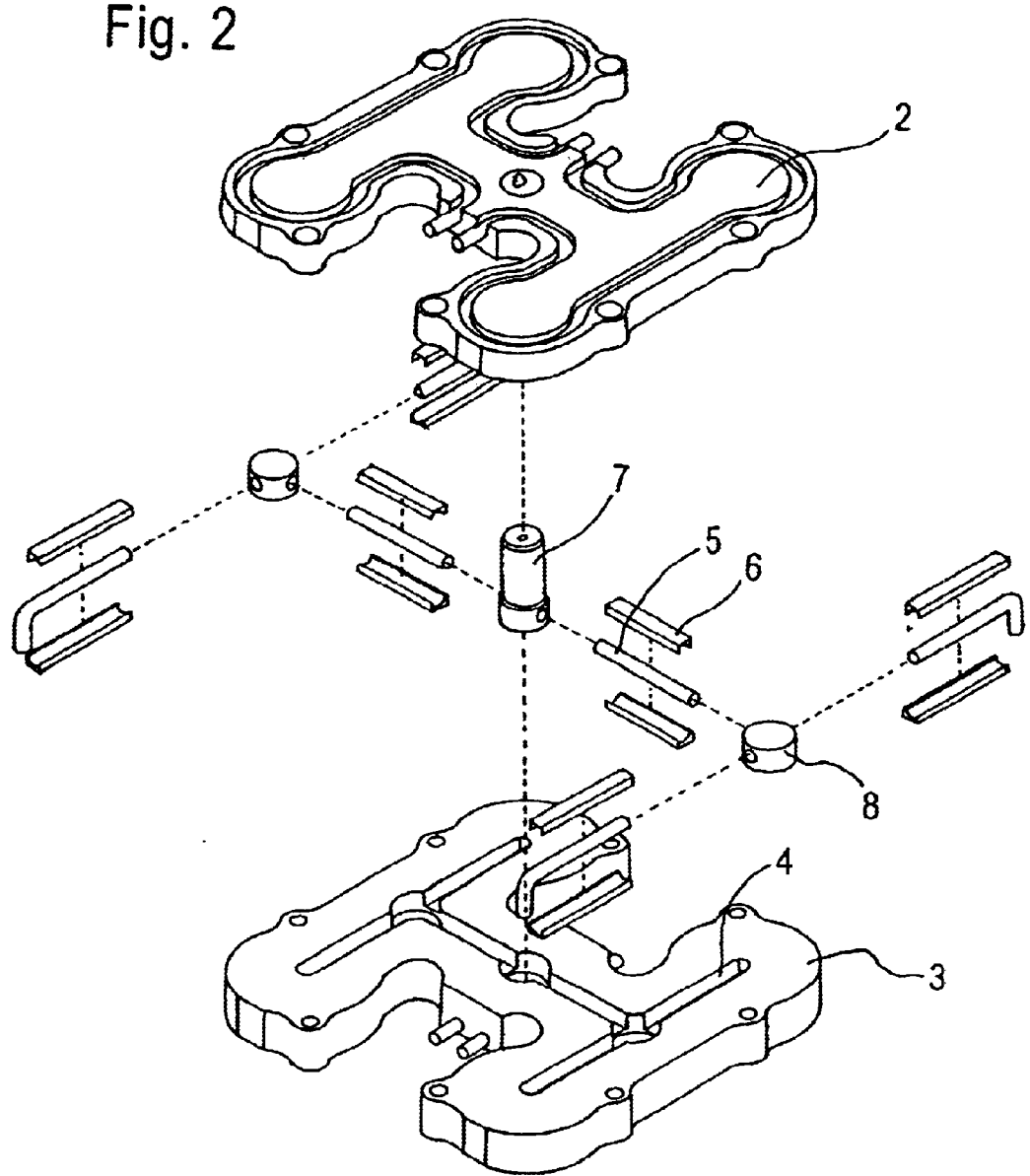
FIG. 2 is an exploded perspective view of the manifold of this invention.
Figure 3:
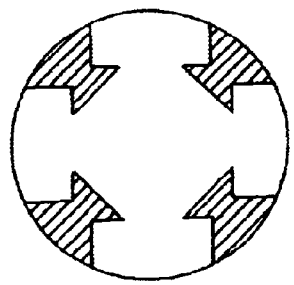
FIG. 3 is a sectional view of a joint block included in the manifold of this invention.
Figure 4:
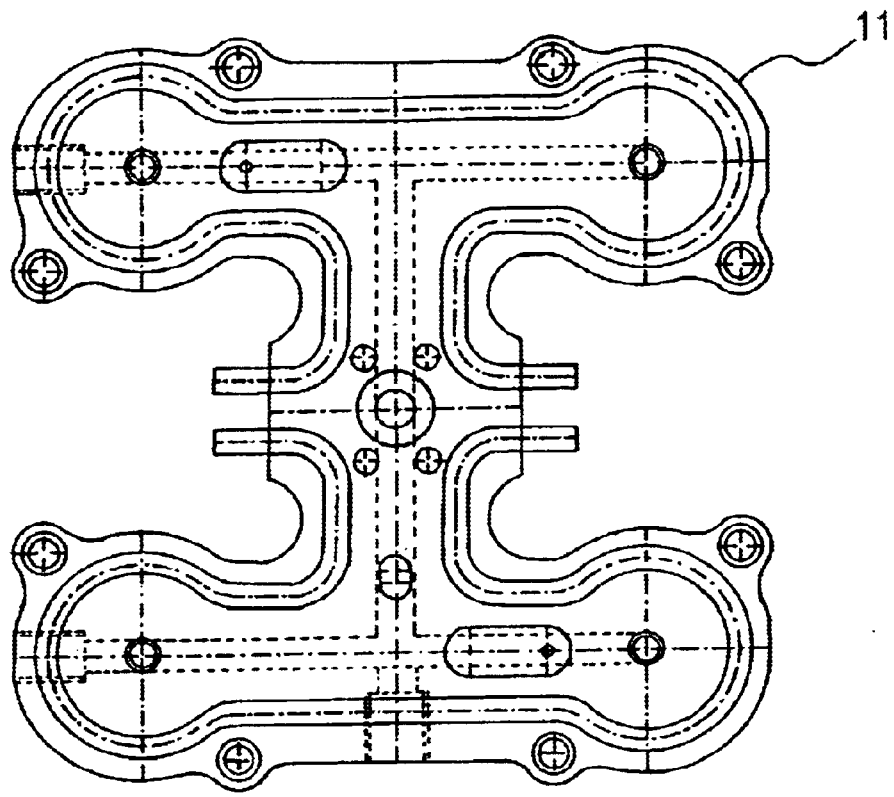
FIG. 4 is a front view showing a conventional manifold.
Figure 5:
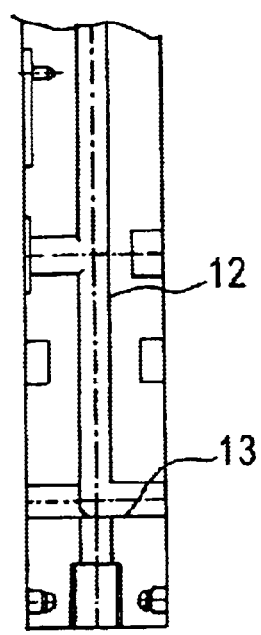
FIG. 5 is a sectional view of the conventional manifold.

FIGS. 1 and 2 are a perspective view and an exploded perspective view respectively showing the manifold of this invention. FIG. 3 is a sectional view of a joint block included in the manifold of this invention.

The manifold 1 consists of an upper plate 2 and a lower plate 3 designed to be separated from the upper plate 2. The lower plate 3 has a groove 4, joint blocks 7 and 8, and ground channel pipes 5. The groove 4 is made to provide flow channels to the lower plate 3. The joint blocks 7 and 8 are installed at junctions where two or more flow channels meet. The ground channel pipes 5 each are covered with two copper plates 6 in such a way as to be received in the groove 4 along with the copper plates 6.

Since the flow channels of the manifold 1 may have various shapes, it is impossible to form the entire flow channels with only one pipe. Thus, the joint blocks 7 and 8 are installed at the junctions where two or more flow channels meet and the ground channel pipes 5 are connected to the joint blocks 7 and 8. The junctions where the joint blocks 7 and 8 are set, are only millimeters in depth, so the angled corners formed at the junctions can be easily ground to have a streamlined shape. In addition, the joint blocks 7 and 8 are made by a lost wax casting method such that the joint blocks 7 and 8 do not have any angled corners, thus ensuring the smooth flow of synthetic resins.

When the flow channel is heated by heaters mounted on the upper and lower plates 2 and 3, the copper plates 6 covering the channel pipe 5 serve to keep the temperature of the flow channel constant, due to the excellent thermal conductivity of the copper.

When manufactured with such a construction, the manifold 1 can bear a high injection pressure as well as be manufactured using another method in place of the gun drilling method.

As described above, the present invention provides a manifold of hot runners for metal molds of injection molding machines, which is designed to be separated into an upper plate and a lower plate while having a flow channel therebetween, and to assemble the upper plate with the lower plate after inserting a channel pipe covered with copper plates in the flow channel, thus being easy to manufacture, and being capable of grinding the flow channel so as to remove angled corners therefrom.

Furthermore, the copper plates allow heat distribution to be uniform throughout the manifold, thus preventing the physical properties of raw materials used in injection molding from being changed.

Due to the removal of the angled corners from the flow channel, a reinforcing additive included in the synthetic resins, such as a glass fiber, is prevented from being broken, thus improving the physical properties of injection molding products.

When the synthetic resins contained in the manifold are carbonized due to an error of temperature control and lose fluidity thereof, the manifold can be separated into the upper plate and the lower plate, thus easily cleaning the interior of the manifold.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a separable manifold of hot runners for metal molds of injection molding machines, comprising the steps of:

designing the manifold in such a way as to be separated into an upper plate and a lower plate;

manufacturing joint blocks to be set on junctions of two or more flow channels formed on said lower plate;

forming a groove on the lower plate for receiving channel pipes therein;

installing said joint blocks at the junctions where the flow channels meet;

covering the channel pipes inserted in the groove with copper plates;

connecting the channel pipes covered with the copper plates to said joint blocks; and assembling the upper plate with the lower plate.

2. A separable manifold of hot runners for metal molds of injection molding machines, consisting of:

an upper plate; and a lower plate designed to be separated from the upper plate, and comprising:

a groove made to provide a flow channel to the lower plate;

a joint block installed at a junction where two or more flow channels meet; and a ground channel pipe covered with copper plates and received in the groove along with the copper plates.

3. The manifold according to claim 2, wherein said channel pipe is covered with the copper plates for keeping the temperature of the flow channel constant.

4. The manifold according to claim 2, wherein said joint block serves as a junction of the flow channels.

5. The manifold according to claim 2, wherein said manifold is designed to be separated into the upper plate and the lower plate along the flow channel.

* * * * *